No. 762,262. PATENTED JUNE 7, 1904.
S. TROOD.
LIQUID FUEL BURNER.
APPLICATION FILED OCT. 15, 1902.
NO MODEL. 2 SHEETS—SHEET 1.
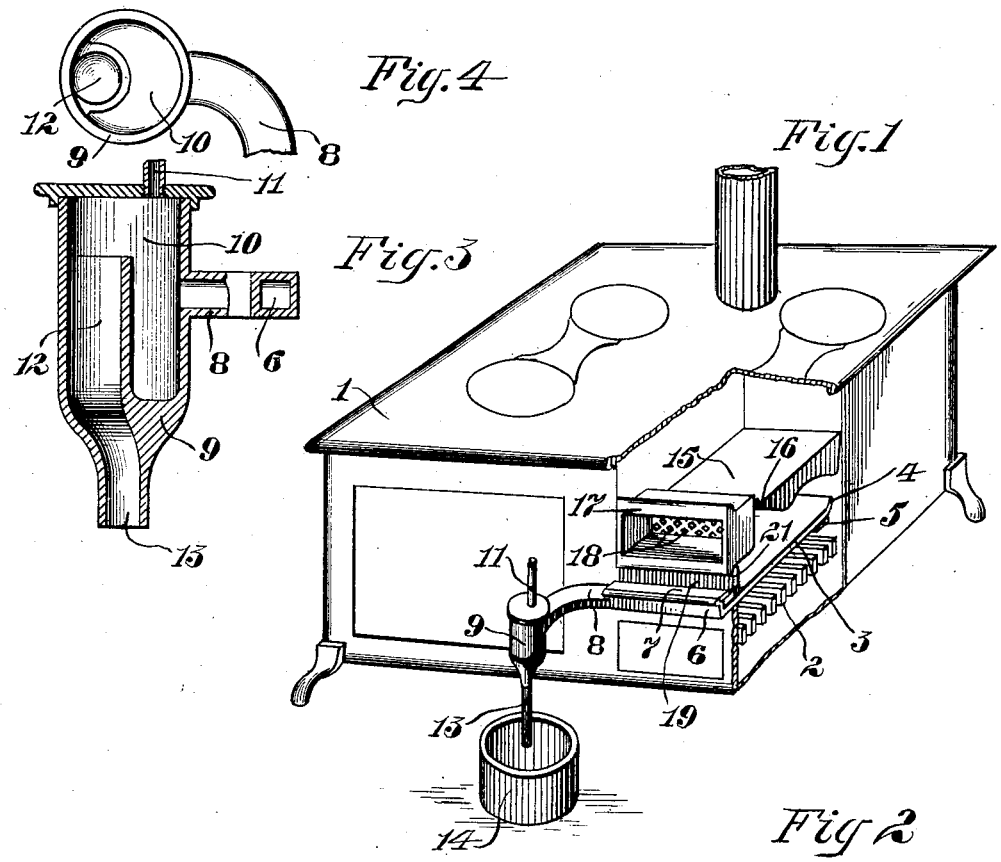
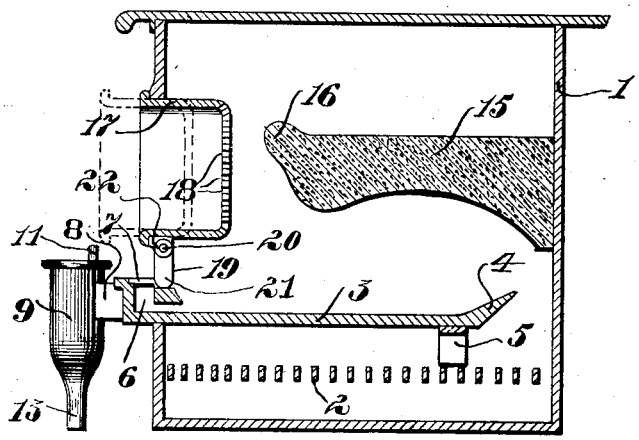
Witnesses
J. F. Pattison
E. A. Jarvis
Inventor:
Samuel Trood
By his Attorney,
F. H. Richards

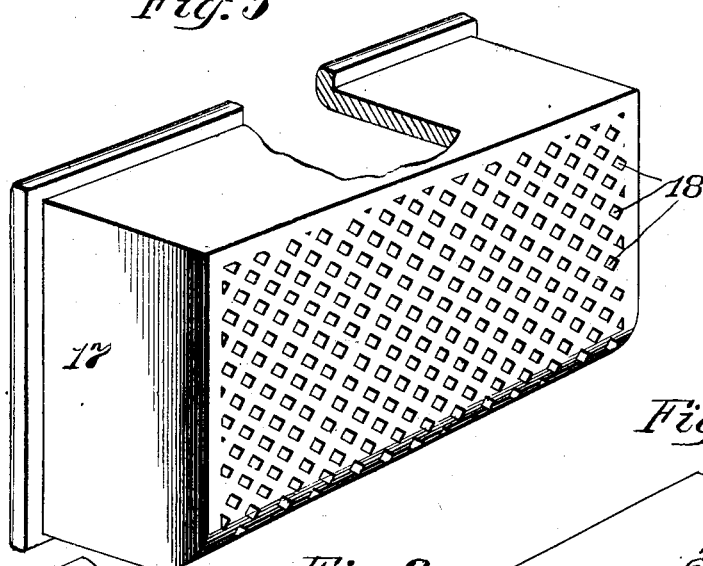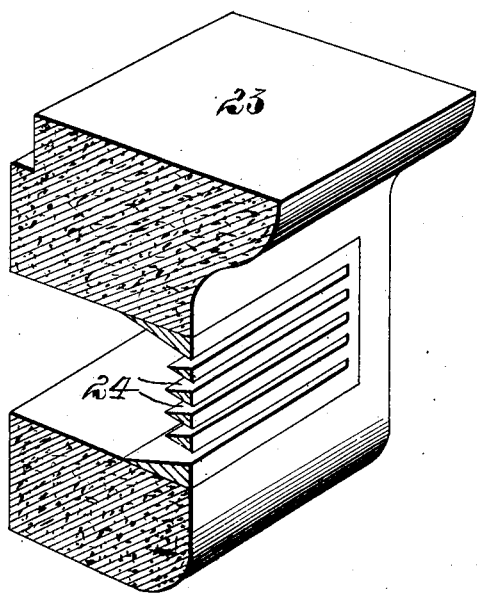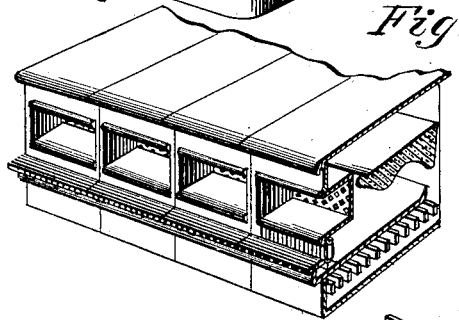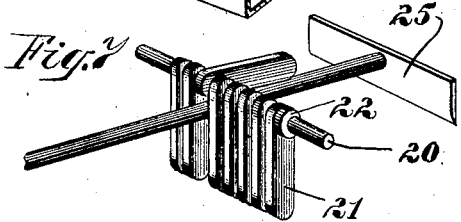

No. 762,262. Patented June 7, 1904.

UNITED STATES PATENT OFFICE.

SAMUEL TROOD, OF NEW YORK, N. Y.

LIQUID-FUEL BURNER.

SPECIFICATION forming part of Letters Patent No. 762,262, dated June 7, 1904.

Application filed October 15, 1902. Serial No. 127,335. (No model.)

*To all whom it may concern:*

Be it known that I, SAMUEL TROOD, a subject of the Emperor of Russia, residing in New York, in the county of New York and State of New York, have invented certain new and useful Improvements in Liquid-Fuel Burners, of which the following is a specification.

The present invention refers to hydrocarbon-burners for use in cooking-stoves, furnaces, steam-boilers, &c.

The object of the invention is to provide a device for burning volatile liquids—as, for instance, crude oil or other hydrocarbons— which shall be simple and effective in construction and shall avoid the defects of the devices heretofore in use, such as the retort-burners, vaporizers, &c.

The invention relates to the class of the pan-burners, and is illustrated in its preferred form in the accompanying drawings, which form a part of the present invention.

Figure 1 is a perspective view of the device applied to a common cooking-stove. Fig. 2 is a transverse cross-section of a part of such a stove. Figs. 3 and 4 are views of the fuel-pot. Fig. 5 is a perspective view of an air-port. Fig. 6 is a similar view, in cross-section, of a modified air-port. Fig. 7 is a detailed view of the cleaning-port; and Fig. 8 is a perspective view of a bank of the devices for use in a furnace, steam-boiler, &c.

1 in Fig. 1 is the casing of a stove, and 2 is the grate of the fire-box. It is one of the important features of the device that it can be readily inserted into the fire-box of any stove without necessitating any material changes in the same.

3 is a pan or trough for the purpose of receiving the liquid fuel and has an inclined rear end 4 for the purpose of easily removing and pushing off into the ash-box by means of a suitable rake any scum which may be formed during the process of combustion.

In the use of crude oil it is found that a considerable quantity of pitch is left in the pan after the volatile portions of the oil have been thrown off by combustion and the action of the heat, and as such pitch can best be removed while hot it is an advantage to be able to do so while the device is in action and in a heated state.

5 is a support for holding the pan 3. It rests on the grate 2 and may be moved with the pan to any desired position on the grate.

6 is the front end of the pan 3, which forms a channel and may preferably be covered by a plate or lid 7 and communicates, by means of the pipe 8, with the fuel-pot 9. The fuel-pot 9, Figs. 3 and 4, contains two compartments, one compartment, 10, for holding a supply of liquid fuel and one other compartment, 12, as an overflow, which latter is preferably connected to a drip pan or receptacle 14 by means of a pipe 13. If desired, this receptacle 14 may be covered with a lid. (Not shown in the drawings.) The fuel-pot 9 receives its fuel from a storage-receptacle by means of a supply-pipe 11.

The combustion-chamber is formed in part by a vault or roof 15, made of fire-clay or other highly-refractory material. This roof is so shaped that it may be placed in and be held by the fire-brick lining of the fire-box of a stove on account of being trapezoidal in cross-section. The space between the fire-brick lining and the roof may be filled with fire-clay.

In the door-opening of the fire-box is placed an air-port 17, having a series of air-holes 18. This port 17 may be made of metal or, as shown in modification 23, Fig. 6, of fire-brick, in which latter case the air holes or channels 24 may be formed as indicated in the drawings. Below the air-port 17 is a cleaning-port 19, consisting of a rod 20, having thereon a series of movable bars 21, separated by washers 22.

It is clearly to be seen that when a rake 25 is pushed through the bars 21 for the purpose of cleaning the surface of the liquid fuel in the pan 3 all the bars lifted by the rake will return to their normal position except the bar under which the rod of the rake is located. By this arrangement the amount of air supplied to the combustion-chamber through this port 19 will remain practically constant, whereas when a solid lid having perforations would be used instead of the movable bars 21 the supply of air would greatly vary during the time of cleaning the pan 3.

The pan-burners heretofore in use did not have a sufficient air-supply. In the present case there are three different ports for the air. The first is formed by part 4 of pan 3 and the rear end of the roof 15. Its size may be varied by changing the position of the pan 3, and the most suitable size may be retained after once adjusting it. The second air-port is formed by the interstices between the movable bars 21. The third air-port is formed by the movable box 17, which may be used to regulate the distance between the front end 16 of the roof 15 and the box 17.

The combustion is initiated by pouring oil in the fuel-pot 9 to a sufficient height so as to cover the pan with fuel. A rag, wick, or paper is ignited and placed in the fuel on the pan, which fuel will then commence to burn, receiving its supply of air primarily from the rear air-port. The flame will strike against the roof 15 and heat the same and will finally find its way between the air-port 17 and roof-front 16 into the upper compartment of the stove. The heat produced therein and the draft of the chimney will draw more air through port 19, and port 17 may then be so adjusted that the width of the flame-port formed by it and the roof-front 16 is such as to produce substantially perfect combustion of the fuel. The heated roof 15 will reflect its heat unto the surface of the fuel in pan 3 and will tend to vaporize the same, and the flame produced will be nearly perfect. It is of importance that some of the air-holes 18 are located higher than the roof-front 16, so as to supply air also to the upper compartment of the stove.

I claim—

1. A liquid-fuel burner comprising a pan; a partition located above said pan and forming a rear air-port with the same; a front air-port substantially on the level of said pan; a movable body having an air-port and located above said front air-port and projecting into the combustion-chamber and forming with said partition an adjustable flame-port; and means to supply liquid fuel to said pan, the organization being such that the draft of air may be regulated by shifting said movable body.

2. A liquid-fuel burner comprising a combustion-chamber; a pan within the chamber and adapted to contain liquid fuel; a roof portion above said pan and a body traversed by an air-port and located at the front of and above said pan and projecting into the combustion-chamber, adapted to admit air to such combustion-chamber and adjustable relatively to said roof portion, the organization being such that the flame-space may be increased or diminished by the shifting of said member.

3. The combination with a combustion-chamber, of means to hold fluid during the combustion; means to adjust the supply of air to the rear of the holding means; a flame-port comprised in part of a roof located above said holding means adapted to direct the course of the flame and to permit the flame to pass the end of said roof and to heat the same, and said roof adapted to reflect heat onto said holding means, and means adjustable toward and from the said roof to supply air to the front of the holding means and to the flame in its passage past the end of said roof to regulate the flame-port and supply air thereto.

4. The combination with a combustion-chamber, of a fuel-container adjustable toward and from the rear wall thereof to form an adjustable air-port, a port comprising a plurality of depending movable members at the front of the chamber, and a body provided with an air-port and adjustably located above the latter and adapted to form an adjustable flame-port with the roof of the combustion-chamber; the organization being such that the current of air fed to said combustion-chamber may be controlled by shifting the fuel-container, thereby opening or closing said adjustable rear air-port, and also by shifting said adjustable body.

5. In a liquid-fuel burner the combination with a combustion-chamber, of a plate to receive the liquid fuel; an air-port into the chamber at the region of the plate; and a grating in such port comprising a number of swinging bars each independently movable and organized to yield to admit a scraper to the pan, to return to normal position after its entrance and exit, and the bar at the region of the handle of the scraper to yield to accommodate such handle.

6. In a liquid-fuel burner the combination with a combustion-chamber having an opening at one side, of a burner-pan therein having a slanting side wall at its end farthest from said opening, and a grid of independently-yieldable members to cover said opening to admit a cleaning-tool, close behind the same and adjust itself to the handle thereof.

In testimony whereof I have hereunto set my hand, in the presence of two subscribing witnesses, this 11th day of October, 1902.

SAMUEL TROOD.

In presence of—
RALPH JULIAN SACHERS,
CECIL E. HARING.